July 14, 1942.  P. J. NATHO  2,290,065
FLUID LEVEL CONTROL
Filed June 24, 1940
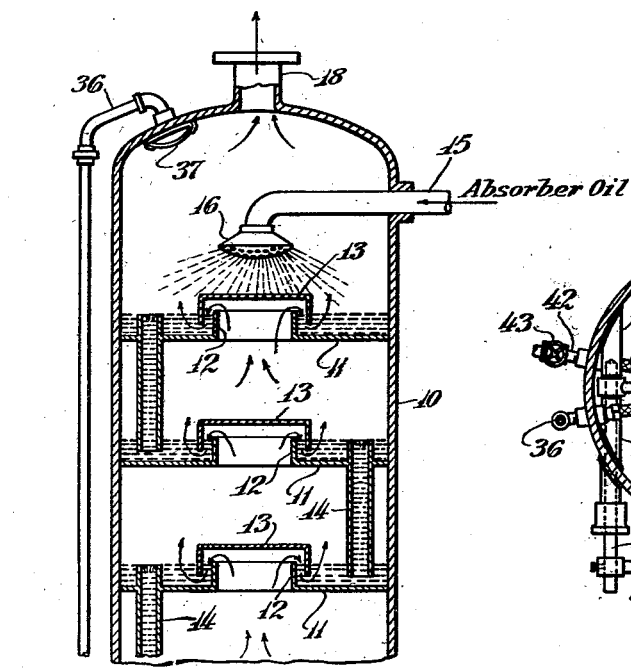
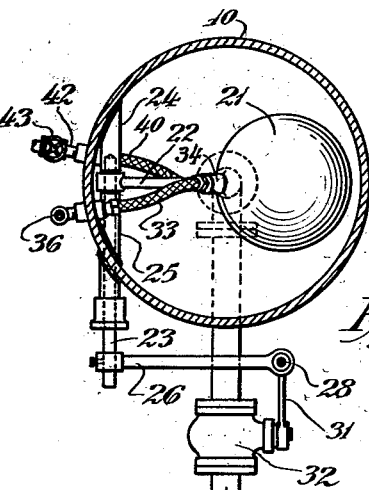
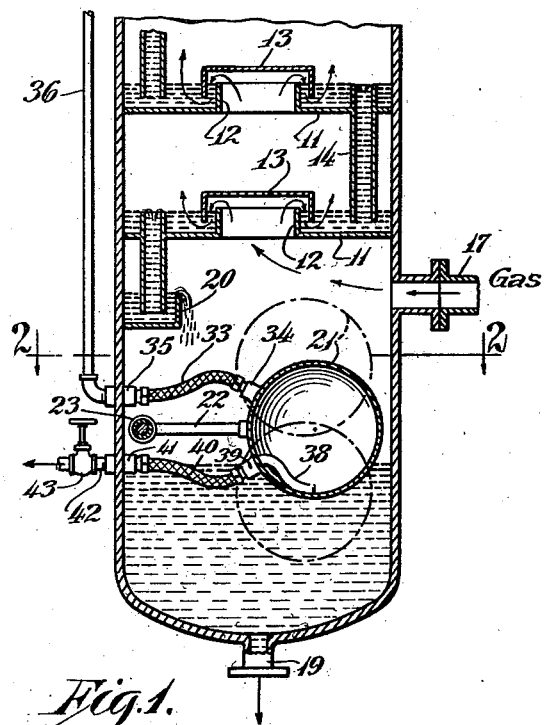
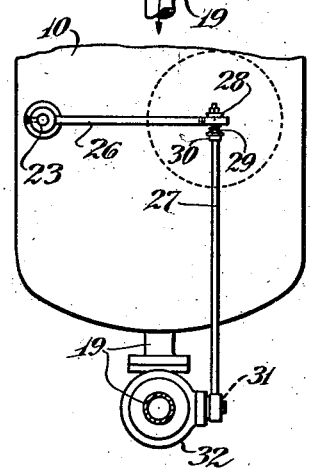
Fig.1.
Fig.2.
Fig.3.
Inventor:
Paul J. Natho
By Donald H. Dickey
Attorney.

Patented July 14, 1942

2,290,065

UNITED STATES PATENT OFFICE 2,290,065

FLUID LEVEL CONTROL

Paul J. Natho, Dickinson, Tex., assignor to Pan American Production Company, Houston, Tex., a corporation of Delaware Application June 24, 1940, Serial No. 342,115

6 Claims. (Cl. 261—70)

This invention relates to fluid level control and relates more particularly to a method and apparatus for controlling fluid level in such vessels as high pressure separators and high pressure absorbers using a light weight float to actuate a valve or other control means exterior of the vessel.

The use of light weight floats for the control of liquid level in vessels at atmospheric and low pressures up to, for example, 200 pounds per square inch, is well known. Such floats may be used to maintain a certain depth of homogeneous fluid in a vessel; to control the height of the interface between two immiscible liquids; or to regulate the fluid level in a liquid phase-vapor phase system. In almost all cases the light weight float is attached to an arm which in turn operates control means, usually exterior of the vessel, whereby a change of level of the fluid, raising or lowering the float, changes the amount of fluid added to or withdrawn from the vessel. Little or no difficulty is encountered in such control means at low pressures. A float of light weight material is readily sensitive to changes in level, and therefore is quickly responsive thereto. If made of a material resistant to deterioration by the contents of the vessel, the float should last indefinitely.

In applying such float control of fluid level to vessels operating at high pressures, grave difficulties have been encountered. The floats of light weight material suitable at low pressures cannot withstand the high pressures to which they are subjected and collapse after a short period, or at best spring leaks whereby the fluid can enter the float, thereby destroying its effectiveness. The obvious manner in which to overcome this defect is to construct the float of stronger, heavier material capable of withstanding the high pressures. Such types of construction immediately introduce other and equally disadvantageous faults. The increased weight decreases the sensitivity of the float to changes in fluid level, thereby decreasing the response to such variations in level and reducing or eliminating the effectiveness of the float as a control means. This can be overcome in part by making the float larger, but since this in turn either requires still heavier materials and/or larger quantities of material, the effect is somewhat offset. Naturally the size of the float will be limited by the size of the vessel as well as the type of fluid contained therein. As can readily be seen, these expedients are not satisfactory; increased weight of material requiring increased size of float, and increased size of float requiring additional heavy material, and so on, ad infinitum.

The ordinary method employed to overcome these difficulties is usually in the nature of a compromise. A float is manufactured of a material which is heavy enough to resist at least for a time the effect of high pressures, but which is still light enough to be somewhat sensitive to fluctuations in level. The periods between shutdowns to replace the floats are thereby lengthened, and the float functions, if not efficiently, at least with sufficient control to maintain the liquid level somewhere within the general range desired. Like most compromises, the results are far from completely satisfactory.

It is an object of my invention to provide a method of fluid level control at high pressures using a light weight float. Another object of my invention is to provide a light weight float for fluid level control at high pressures which will not collapse or develop leaks. A further object is to provide a method whereby light weight floats suitable for fluid level control at low pressures are adapted for use at high pressures without danger of collapse or leakage. A still further object is to provide an improved high pressure separator or absorber for hydrocarbons including non-collapsing light weight fluid level float control. Other objects and advantages will become apparent as the description of my invention proceeds, read in conjunction with the accompanying drawing which forms a part of this specification.

In the drawing:

Figure 1 is an elevation, partly in section, of a high pressure absorption tower including my modified float for fluid level control;

Figure 2 is a sectional view taken along the line 2—2 of Figure 1 showing exterior control means for maintaining a fluid level; and Figure 3 is an elevation of the lower portion of a high pressure absorber showing one form of linkage exterior of the absorber for fluid level control.

Although my invention is applicable to any process requiring fluid level control, it finds particularly apt use in the separation or fractionation of hydrocarbons from the production or refining of natural gas, "distillate," crude oil, or their by-products. Specifically, it can be used to advantage in such processes as the recovery of gasoline from natural gas or "distillate" wells by retrograde condensation or high pressure absorption, the separation of normally liquid hydrocarbons from normally gaseous hydrocarbons produced by high pressure cracking or polymerization, and similar petroleum refining operations requiring the use of high pressures. For example, the separator in retrograde condensation can be suitably operated at pressures of from 600 to 2000 pounds per square inch, preferably at 900 to 1800 pounds per square inch. The fractionation of liquid hydrocarbons recovered by retrograde condensation can be carried out at pressures of from 250 to 600 pounds per square inch and preferably at 400 pounds per square inch. A high pressure absorber for use with retrograde condensation can be maintained at pressures of from 1000 to 5000 pounds per square inch, usually at from 1200 to 3000 pounds per square inch, for example, at 2000 pounds per square inch. Ordinary absorbers for depropanization of products from cracking are suitably operated at from 200 to 400 pounds per square inch. Similar examples of processes for the useful utilization of my invention could be cited at length and will be readily recognized by those skilled in the art. In all of these examples, it is usually desirable to maintain one or more fairly constant fluid levels, and this can be done advantageously with automatic float controls, providing, of course, that sufficient sensitivity to changes in level can be obtained and that there is little or no need for frequent discontinuation of operations for replacement of broken or leaky floats. As has been pointed out previously, ordinary light weight floats cannot withstand the elevated pressures, and heavier floats are not satisfactory as regards sensitivity to changes in level, etc. My invention, however, eliminates all such objections, and permits control of fluid level under practically all conditions of pressure.

My invention will be described as applied to a high pressure absorption system but it should be understood to be applicable to any and all processes involving float control of fluid level, particularly those operated at high pressures, for example, above 200 pounds per square inch.

Referring now to the drawing and particularly Figure 1, vessel 10 forms the walls of a high pressure absorption tower in which a plurality of bubble trays 11 with the vapor risers 12, bubble caps 13 and downspouts 14 provide means for contact of absorber oil and gas or "distillate." Absorber oil, which can be any suitable oil such as heavy naphtha, light gas oil, etc., enters through line 15 and spray 16, passing downward over bubble trays 11 from downspouts 14, whereby it contacts gases and/or vapors from line 17. The tower can be operated with a pressure of from 1000 to 3500 pounds per square inch, usually from 1200 to 2500 pounds per square inch as, for example, 2000 pounds per square inch. The absorber oil, which is added at any desired ratio such as one to six gallons per 1000 cubic feet of gas, absorbs hydrocarbons having, for example, more than two carbon atoms per molecule, thus enriching the oil. The methane and/or ethane, together with any hydrogen, if present, escape overhead through line 18. The enriched absorber oil with the hydrocarbons absorbed therein is removed from the base of vessel 10 by line 19. A seal pot 20 below the lowermost downspout prevents to a large extent the passage of gases up through the downspout and permits the overflow of enriched absorber oil from the bubble trays to the base of vessel 10.

It is desirable for the efficient operation in the absorption tower that a fluid level be maintained within rather well-defined limits within the base of the tower. The accumulation of too great quantities of liquid would raise the liquid above the opening of gas line 17 and the seal pot 20, thereby preventing the tower from functioning. Too little liquid would permit the gases to escape via line 19 without sufficient contact with the absorber oil, and thereby without the separation of the "dry gas" from the higher molecular weight hydrocarbons. To control the fluid level within vessel 10, a float 21 is employed which is attached to arm 22, which in turn is keyed to shaft 23 extending beyond the vessel walls (Figure 2). Shaft 23 is journaled in bearings 24 and 25 whereby shaft 23 can be freely rotated. A shaft 26 is keyed external of the shell to shaft 23 and also is joined to rod 27 (Figure 3) by a rocker beam 28 and spring 29 held in place by nut 30. Rod 27 is movably connected to lever 31 which controls the valve stem in valve 32 inserted in line 19.

In accordance with this method of operation, when the liquid level in vessel 10 increases in height, float 21 rises, thereby lifting arm 22 which turns shaft 23 and by the series of linkages previously discussed opens valve 32 in line 19 so that increased quantities of liquid are withdrawn. As more liquid is withdrawn, the fluid level sinks, and valve 32 returns to its original position thereby insuring constant level. This same procedure is true when the liquid level decreases below a given point thereby dropping float 21 and causing valve 32 to close sufficiently to decrease the amount of liquid withdrawn through line 19.

Float 21 can be made of any light weight metal or alloy suitably formed or welded to withstand moderate pressures. It may be spherical as shown or may assume other appropriate shapes such as a flattened spheroid, an ellipsoid, etc., being in all cases hollow and adapted to float within the vessel on the surface of a liquid or at the interface between two liquids, for instance, oil and water. When operating at the pressures herein set forth, a light weight metal float of hollow construction would be subject to collapse, particularly in the event of unexpected pressure surges, necessitating shutdown of the tower and the removal of the bubble tray assemblies for replacement. In order to overcome this, I connect the float via line 36 to the gas space at the top of the vessel. This can be accomplished by the use of flexible tubing 33 between a tubular projection 34 on float 21 and a nipple 35 on a pipe 36 leading to the top of vessel 10. I have illustrated my invention by showing the pipe 36 rising external of the vessel but it should be obvious that this can be installed within the vessel 10, preferably against one wall of the vessel to interfere as little as possible with the flow of fluids across the bubble trays, etc. A baffle 37 protects the opening of line 36 in the upper part of vessel 10 and helps to prevent the entrance of entrained oil with the gases. Since by this means the pressure within float 21 is the same as that of the absorption tower and particularly the same as that of the gases in the upper part of the tower, there is little or no danger of collapse of the float, any changes in pressure within the tower being immediately reflected within the float, thereby obtaining an equalization of the inner and outer pressures. By using a flexible tube 33 of the proper length, floats 21 is free to rise and fall at will without hindrance or loss in sensitivity. Any material resistant to deterioration by the fluid contents of the vessel and sufficiently flexible to permit the unhampered action of the float and its attached arm can suitably be employed, for instance, where oil is involved, neoprene, thiokol or the like.

In spite of the use of baffle 37 minor amounts of absorber oil will, in many instances, find their way through line 36 into float 21, thereby increasing the weight of the float and decreasing or maladjusting its sensitivity to rise and fall of the fluid level within the tower. In order to control this I can, if desired, install within float 21 a line 38 extending from the lowermost portion of the float through tubular projection 39 to a flexible line 40, of resistant material as described, which in turn is joined to nipple 41 and line 42 leading beyond the vessel walls through a valve 43. Under ordinary circumstances valve 43 is kept closed, but it can be opened periodically for the release of liquid accumulating within float 21. The pressure within the vessel 10 and therefore within float 21 being considerably greater than the atmospheric pressure beyond the vessel walls, the liquid is immediately forced out through lines 38 and 40 for discharge beyond the confines of the tower. The tubular projections 34 and 39 are spaced from arm 22 on float 21 in such a manner that the float is balanced, and there is no tendency for it to twist or turn on arm 22, to which it is fastened securely, as by welding, etc. Therefore, although line 38 within float 21 can be located to exit from float 21 at the center of the lowermost portion, this is not desirable unless line 33 exits from float 21 at the center of the uppermost portion. As a matter of maintaining balance I prefer to locate tubular projections 34 and 39 on the side of the float nearest the arm.

It will be understood from my description that I have succeeded in utilizing an ordinary light weight hollow float in the control of fluid level at high pressures by the novel procedure of equalizing the internal and external pressures on the float, thereby retaining the sensitivity and ease of operation ordinarily found with floats of this type at low pressures, and at the same time preventing its collapse or disintegration through the high pressures encountered. The apparatus is inexpensive, economical to manufacture, and has few, if any, parts which would easily come out of adjustment. Shutdowns for replacement or adjustment are reduced to a minimum and accurate control is maintained.

Although I have illustrated my invention as involving one float for fluid level control, it is equally applicable in operations where fluid level control at more than one level is necessary or desirable. In the retrograde condensation of hydrocarbons from producing wells of the "distillate" type, for example, it is usually necessary to avoid natural gas hydrate trouble and this can be done in one way by the addition of liquid or gaseous antifreeze material to the well fluids. In separating the hydrocarbon fractions, the antifreeze material gravitates at the bottom of the separator, and its liquid level can be controlled by my improved float, as can the fluid level between gaseous and liquid hydrocarbons in the same vessel. Such separators are ordinarily maintained at about 600 to 2000 pounds per square inch, preferably about 900 to 1800 pounds per square inch.

My invention can also be employed for fluid level control at subatmospheric pressures, particularly with high vacuum processes. Generally speaking, however, the differential between the pressure within the float and the vessel pressure is not as great as those processes employing high pressures, and therefore, there is not as frequent destruction of the ordinary light float, so that the demand for a float to withstand the rigors of the subatmospheric pressures is not as great.

I have illustrated my invention as applied to a high pressure absorption tower, but it should be thoroughly understood that it is equally applicable to any and all types of vessels requiring fluid level control providing there is a gas space within the vessel, or at substantially the pressure of the vessel, from which an equalizing line can be extended to the float. I have also illustrated my invention with reference to certain valve-control means responsive to the action of the float. Other means capable of control by variations in the rise and fall of a float-supported arm are equally suitable, and are included within the scope of this invention. Also, while I have shown float control of liquid level by linkage to a valve in the liquid withdrawal line, my improved float can also be used for the control of the gas outlet in response to changes in liquid level by linkage to control means in the gas withdrawal line.

Although I have illustrated my invention by description of one preferred embodiment thereof, I do not intend to be limited thereto, but only insofar as is set forth in the appended claims.

I claim:

1. In a vessel for achieving gas and liquid contact under conditions of super-atmospheric pressure having a liquid inlet adjacent to the top of the vessel, a liquid outlet in the bottom of the vessel, a gas inlet adjacent to the bottom of the vessel, a gas outlet adjacent to the top of the vessel, means within the vessel to achieve intimate contact between the downwardly moving liquid and the upwardly moving gas, additional means within the vessel to maintain a pool of liquid in the bottom of the vessel, a float pivotally mounted within the vessel and adapted to float on the top of the pool of liquid in the bottom of the vessel, valve means in said liquid outlet operatively connected to said float whereby movement of the float actuates the valve, the improvement comprising a plurality of flexible conduits, one end of each conduit being connected with the interior of the float, the free end of one of said conduits being connected to and in communication with the upper end of the vessel whereby the pressure within the float is maintained substantially equal to the pressure in the upper end of the vessel, the free end of another of said flexible conduits being connected to an outlet provided adjacent to the lower end of the vessel, and a valve in said last-mentioned outlet to control the withdrawal of any liquid in the float, said flexible conduits being adapted to permit unrestricted movement of the float about its pivot but also being adapted to restrain rotational movement of the float.

2. In a vessel for achieving gas and liquid contact under conditions of super-atmospheric pressure having a liquid inlet adjacent to the top of the vessel, a liquid outlet in the bottom of the vessel, a gas inlet adjacent to the bottom of the vessel, a gas outlet adjacent to the top of the vessel, means within the vessel to achieve intimate contact between the downwardly moving liquid and the upwardly moving gas, additional means within the vessel to maintatin a pool of liquid in the bottom of the vessel, an arm pivotally mounted within the vessel adjacent to the bottom thereof, a float secured to the free end of said arm adapted to float on the surface of the pool of liquid therein, a valve in said liquid outlet operatively connected to the float whereby movement of the float actuates the valve, the improvement comprising a flexible conduit having one end connected with the interior of the float and the other end being fixed in the wall of the vessel, and a gas conduit having one end attached to the fixed end of the flexible conduit and the other end being in communication with the upper end of the vessel whereby the pressure within the float is maintained substantially equal to the pressure in the upper end of the vessel, said flexible conduit being adapted to permit unrestricted movement of the float in an arc about its arm but also being adapted to restrain rotational movement of the float.

3. In a vessel for achieving gas and liquid contact under conditions of super-atmospheric pressures having a liquid inlet adjacent to the top of the vessel, a liquid outlet in the bottom of the vessel, a gas inlet adjacent to the bottom of the vessel, a gas outlet adjacent to the top of the vessel, means within the vessel to achieve intimate contact between the downwardly moving liquid and the upwardly moving gas, additional means within the vessel to maintain a pool of liquid in the bottom of the vessel, an arm pivotally mounted within the vessel adjacent to the bottom thereof, a float secured to the free end of said arm adapted to float on the surface of the pool of liquid therein, a valve in said liquid outlet operatively connected to the float whereby movement of the float actuates the valve, the improvement comprising a flexible conduit having one end connected with the interior of the float and the other end thereof being fixed in the wall of the vessel, a gas conduit having its lower end secured to and in communication with the fixed end of the flexible conduit, the other end of said conduit being in communication with the upper end of said vessel whereby the pressure within the float is maintained substantially equal to the pressure in the upper end of the vessel, a second flexible connection having one end attached to the float in spaced relationship with respect to the point of attachment of said first-named flexible conduit, the other end of said second flexible conduit being fixed in the wall of the vessel below the point of attachment of the first-named flexible conduit to the wall, an outlet associated with said second mentioned conduit and a valve in said outlet to control the withdrawal of any liquid within the float, said flexible conduits being adapted to permit unrestricted movement of the float in an arc about its arm but also being adapted to restrain rotational movement of the float.

4. In a vessel for achieving gas and liquid contact under conditions of super-atmospheric pressures having a liquid inlet adjacent to the top of the vessel, a liquid outlet in the bottom of the vessel, a gas inlet adjacent to the bottom of the vessel, a gas outlet adjacent to the top of the vessel, means within the vessel to achieve intimate contact between the downwardly moving liquid and the upwardly moving gas, additional means within the vessel to maintain a pool of liquid in the bottom of the vessel, an arm pivotally mounted within the vessel adjacent to the bottom thereof, a float secured to the free end of said arm adapted to float on the surface of the pool of liquid therein, a valve in said liquid outlet operatively connected to the float whereby movement of the float actuates the valve, the improvement comprising a flexible conduit having one end connected with the interior of the float at a point above the point of attachment of the float to the arm, the other end of said conduit being secured in the wall of the vessel at a position above the pivot point of said arm, a vertically disposed conduit having its lower end attached to and in communication with the fixed end of the flexible conduit, the upper end of said gas conduit being in communication with the upper end of said vessel whereby the pressure within the float is maintained substantially equal to the pressure in the upper end of the vessel to prevent collapse of said float, a second flexible conduit secured at one end with the interior of the float at a position below the point of attachment of the float to the arm, the other end of said second flexible conduit being fixed in the wall of the vessel at a position below the pivot point of the arm, a drain outlet in communication with the fixed end of said second flexible conduit and valve means in the drain outlet to control the withdrawal of any liquid in the float, said flexible conduits being adapted to prevent unrestricted movement of the float in an arc about its arm but also being adapted to restrain rotational movement of the float.

5. In a vessel for achieving gas and liquid contact under conditions of super-atmospheric pressures having a liquid inlet adjacent to the top of the vessel, a liquid outlet in the bottom of the vessel, a gas inlet adjacent to the bottom of the vessel, a gas outlet adjacent to the top of the vessel, means within the vessel to achieve intimate contact between the downwardly moving liquid and the upwardly moving gas, additional means within the vessel to maintain a pool of liquid in the bottom of the vessel, an arm pivotally mounted within the vessel adjacent to the bottom thereof, a float secured to the free end of said arm adapted to float on the surface of the pool of liquid therein, a valve in said liquid outlet operatively connected to the float whereby movement of the float actuates the valve, the improvement comprising a flexible conduit having one end connected with the interior of the float at a point above the point of attachment of the float to the arm and in line with the point of attachment of the float to the arm, the other end of said conduit being secured in the wall of the vessel at a position above the pivot point of said arm, a vertically disposed conduit having its lower end attached to and in communication with the fixed end of the flexible conduit, the upper end of said gas conduit being in communication with the upper end of said vessel whereby the pressure within the float is maintained substantially equal to the pressure in the upper end of the vessel to prevent collapse of said float, a second flexible conduit secured at one end with the interior of the float at a position below the point of attachment of the float to the arm and in line with the point of attachment of the float to the arm, the other end of said second flexible conduit being fixed in the wall of the vessel at a position below the pivot point of the arm, a drain outlet in communication with the fixed end of said second flexible conduit and valve means in the drain outlet to control the withdrawal of any liquid in the float, said flexible conduits being adapted to prevent unrestricted movement of the float in an arc about its arm but also being adapted to restrain rotational movement of the float.

6. In an absorption tower operating under conditions of super-atmospheric pressures having an absorber oil inlet adjacent to the top of the tower, an enriched absorber oil outlet in the bottom of the tower, a gas or vapor inlet adjacent to the bottom of the tower, a gas outlet adjacent to the top of the tower, means within the tower to permit intimate contact between the absorber oil and the gas or vapor moving upwardly in the tower to enrich the oil, further means within the tower to maintain a pool of enriched oil in the bottom of the tower, an arm mounted for pivotal movement about the horizontal axis within the tower adjacent to the bottom thereof, a float fixed to the free end of said arm adapted to float on the surface of the pool of oil therein, a valve in the oil outlet operatively connected to the float whereby movement of the float actuates the valve, the improvement comprising a flexible conduit attached at one end with the interior of the float at a position above the point of attachment of the float to the arm, the other end of said flexible conduit being fixed in the wall of the tower at a location above the pivot point of the arm, a vertical conduit located exteriorly of the tower having its lower end connected to and in communication with the fixed end of the flexible conduit, the upper end of the conduit being in communication with the interior of the upper end of the tower whereby the pressure within the float is kept substantially equal to the pressure in the upper end of the tower thus preventing collapse of the float, a second flexible conduit having one end connected with the interior of the float at a point below the point of attachment of the float to the arm, the other end of said second flexible conduit being fixed in the wall of the tower at a point below the pivot point of the arm, a drain outlet exterior of the tower and in communication with the fixed end of the second flexible conduit, and a valve disposed in said outlet to control the withdrawal of any liquid in the float, said flexible conduits being adapted to permit unrestricted movement of the float in an arc about its arm but also being adapted to restrain rotational movement of the float.

PAUL J. NATHO.